US005214968A

United States Patent [19]

Kenney

[11] Patent Number: 5,214,968

[45] Date of Patent: Jun. 1, 1993

[54] PIPET FILLING AND DISCHARGE DEVICE

[75] Inventor: James W. Kenney, Broomall, Pa.

[73] Assignee: Drummond Scientific Company, Broomall, Pa.

[21] Appl. No.: 817,388

[22] Filed: Jan. 6, 1992

[51] Int. Cl.$^{5}$ .............. G01N 1/14

[52] U.S. Cl. .............. 73/864.15

[58] Field of Search .......... 73/864.01, 864.11-864.15; 422/100; 436/180

[56] References Cited

U.S. PATENT DOCUMENTS

| | | | |
|---|---|---|---|
| 3,834,240 | 9/1974 | Kenney | 73/864.15 |
| 3,963,061 | 6/1976 | Kenney | 73/864.14 |
| 4,444,062 | 4/1984 | Bennett et al. | 73/864.11 |
| 4,527,437 | 7/1985 | Wells | 73/864.11 |
| 4,624,147 | 11/1986 | Kenney | 73/864.15 |
| 4,690,005 | 9/1987 | Tervamaki et al. | 73/864.17 |
| 4,763,535 | 8/1988 | Rainin et al. | 73/864.16 |
| 4,988,481 | 1/1991 | Jarvimaki et al. | 73/864.13 |
| 5,002,737 | 3/1991 | Tervamaki | 73/864.13 |

*Primary Examiner*—Robert Raevis

*Attorney, Agent, or Firm*—Stuart S. Bowie

[57] ABSTRACT

A pipette gun in which the pump mechanism for creating suction to draw liquids into the pipette and for creating pressure for forcing the liquid out of the pipette includes a generally oval flexible diaphragm.

2 Claims, 3 Drawing Sheets

PIPET FILLING AND DISCHARGE DEVICE

STATEMENT AS TO RIGHTS TO INVENTIONS MADE UNDER FEDERALLY SPONSORED RESEARCH AND DEVELOPMENT

This invention was not made under any Federally sponsored research and development.

CROSS-REFERENCE TO RELATED APPLICATIONS

There are no related applications.

BACKGROUND OF THE INVENTION

1. Field of the Invention

The present invention relates to hand-held devices, commonly called pipet guns, wherein fluids are drawn into and thereafter expelled from pipets for medical and other uses.

2. Background Art

Although generally much larger in size, there are a number of prior art devices which use suction to draw fluids into attached pipets and thereafter expel such fluids from such pipet. See, e.g., my U.S. Pat. Nos. 3,963,061, 3,834,240 and 4,624,147, all of which are incorporated herein by reference.

As described in my previous patents, the practice of drawing liquids into pipets by mouth can be dangerous and the practice has been prohibited in many laboratories.

Pipet guns heretofore devised overcome this health problem, but are heavy and large. Since the operator must draw a large number of samples, there is a true need for a hand-held unit which is light to avoid fatigue and which does not have to be connected to any number of auxiliary devices or supply sources, such as an air pressure and vacuum pump.

In short, there is a real need for a pipet gun which is small, such that the hand grip can be easily held even by a small hand, which is light, yet which has a very powerful air and suction unit.

Pipet guns have been developed with self-contained air/vacuum supply units. However, these units are overly large and unwieldy and are very heavy.

SUMMARY

This invention relates to devices for drawing and then discharging fluids into and from pipets for medical purposes and the like. (Hereinafter, such devices are referred to as "pipet guns".)

Stated briefly, one important object of this invention is to provide a pipet gun, with a self-contained air pump, and which is small enough to be easily held in a normal hand.

Air supply means 50 has a motor 49 for creating pressure and vacuum by moving elements in the manner of a pump.

As mentioned, valves 31 and 29 are depressed by finger movement as described in the '147 patent to respectively create a vacuum in the hose 23*a* to draw the liquid into pipet 13 or to create pressure in the hose 23 to expel the liquid from pipet 13. More specifically, vacuum plunger 31 has a collar 31*a* which moves lever 28 of the microswitch 40. Similarly, pressure plunger 29 has a collar 29*a* which, if 29 is pressed, also moves lever 28.

Thus, when either plunger 29 or 31 are pressed, lever 28 is moved. Such movement, in turn, serves to activate microswitch 40 so as to close the circuit between it and motor 49. Thus, shaft 60 of motor 49 is caused to turn in one direction by motor 49 under control of switch 40.

Similarly, pipet guns developed in an attempt to overcome the above disadvantages have, as mentioned, utilize very large and cumbersome supply units which do not fit into the hand grip and which make the gun heavy and unwieldy to use over extended lengths of time.

By contrast, the present invention includes a self-contained supply source for air pressure and vacuum and a motor for the pump which causes a piston to move to create pressure or vacuum.

An important element in this reduction in size has been the development of an oval-like diaphragm for the air supply unit. The oval shape has made it possible to create a very powerful air and vacuum source in a size so small that the supply unit fits within the normally size hand grip of a pipet gun.

DESCRIPTION OF THE PREFERRED EMBODIMENT

Figure 1:
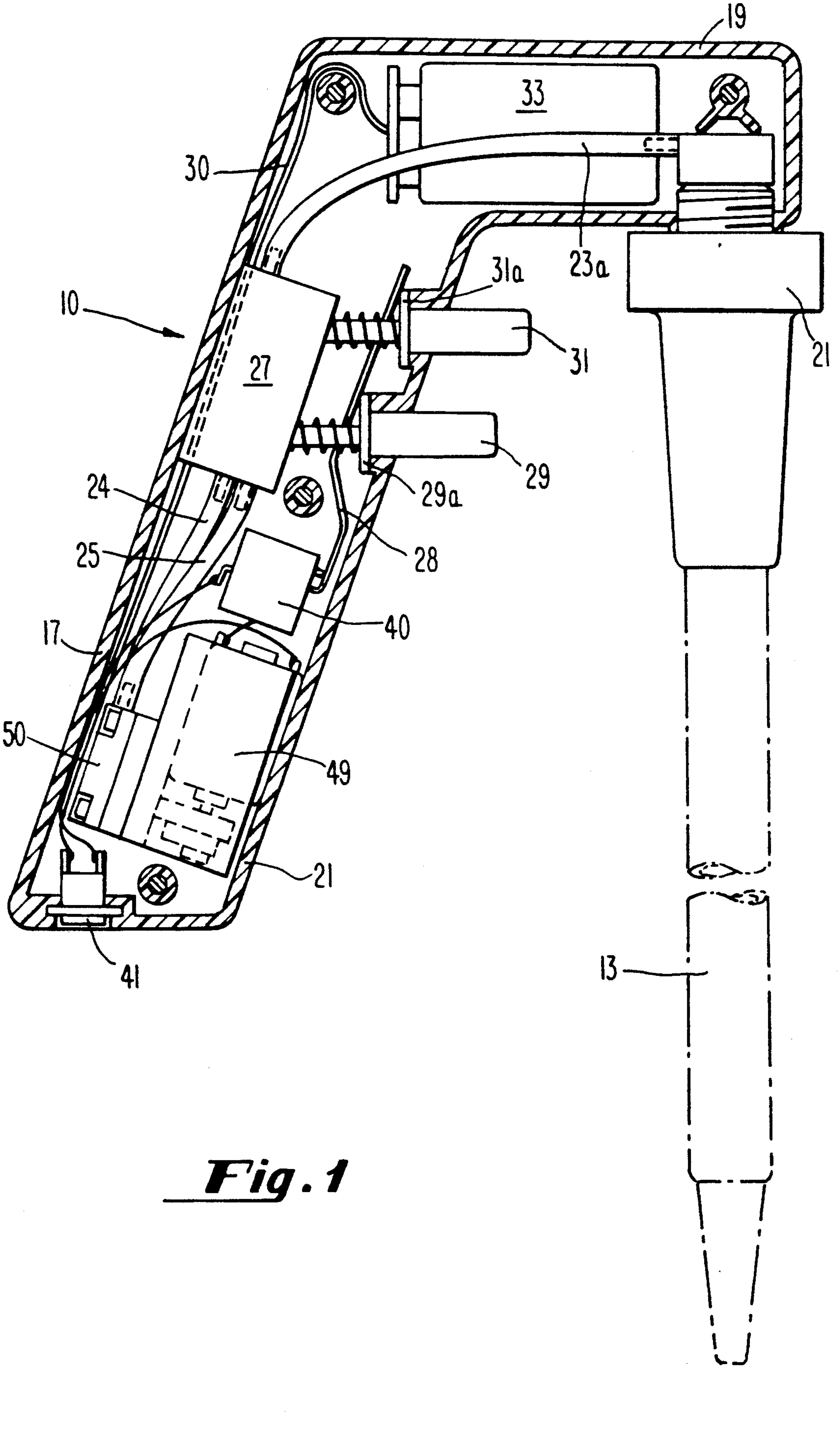
FIG. 1 is an elevational view of one preferred embodiment of the pipette gun of this invention with one cover half removed to reveal the interior mechanisms of the pipette gun.

In FIG. 1 there is shown a preferred embodiment of the pipet gun of this invention 10, which as shown has an outer cover 19. (The other half of cover 19 has been removed to disclose the mechanisms within the pipet gun.)

Pipet gun 10 is, as mentioned, designed to draw liquid into and thereafter expel it from, a pipet 13. Pipet gun 10 includes a hand grip portion 17 and a barrel portion 19*a* and has a coupling 21 which is adapted to hold pipet 13 in a manner which is shown and described in my U.S. Pat. No. 3,963,061.

An air hose 23*a* is connected from the pipet-supporting portion 21 via valve means 27 which is constructed in accordance with my U.S. Pat. No. 4,624,147. The valve means 27 is controlled by a vacuum valve 31 and a pressure valve 29. Valves 31 and 29 are depressed by finger movement as described in the U.S. Pat. No. '147 patent to respectively create a vacuum in the hose 23*a* to draw the liquid into pipet 13 or to create pressure in the hose 23 to expel the liquid from pipet 13. (Alternatively, valve 27 may be constructed in accordance with my U.S. Pat. No. 3,963,061.)

Vacuum air hose 24 and pressure air hose 25 are connected to the bottom of valve mechanism 27. At its lower end, hoses 24 and 25 are connected to air pressure/vacuum means 50 (hereinafter generally referred to as the "air supply means 50" for simplicity's sake).

Air supply means 50, which will be described below in more detail, has a motor 49 which is activated by a microswitch 40 which is activated via the wiring shown by lever 28 which, in turn, is moved by collar 31*a* of vacuum plunger 31 and collar 29*a* of air pressure plunger 29.

Power for motor 49 is supplied by a rechargeable battery 33. Battery 33 is recharged using a charging coupling 41 via wire 30.

Microswitch 40 is activated to cause electricity to run through the wires to activate motor 49 by movement of lever 28 which, in turn, is moved by inward movement of plunger collars 31*a* or 29*a*. Thus, shaft 60 of motor 49 is caused to turn in one direction by motor 49 under control of switch 40.

Figure 2:
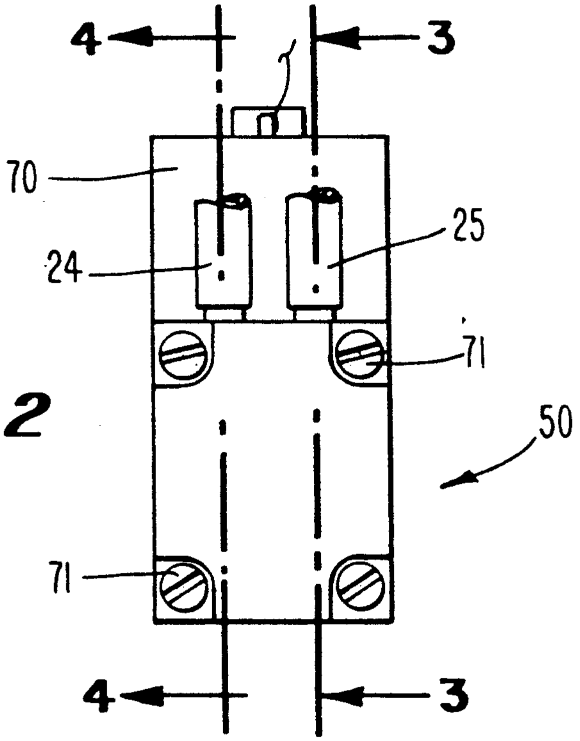
FIG. 2 is an end view in elevation of the unique air and vacuum pump assembly of this invention.

FIG. 2 shows a left end elevation of air supply assembly 50 in FIG. 1. This Figure shows air vacuum hose 24 and air pressure hose 25 emerging from the top of unit 50.

Figure 3:
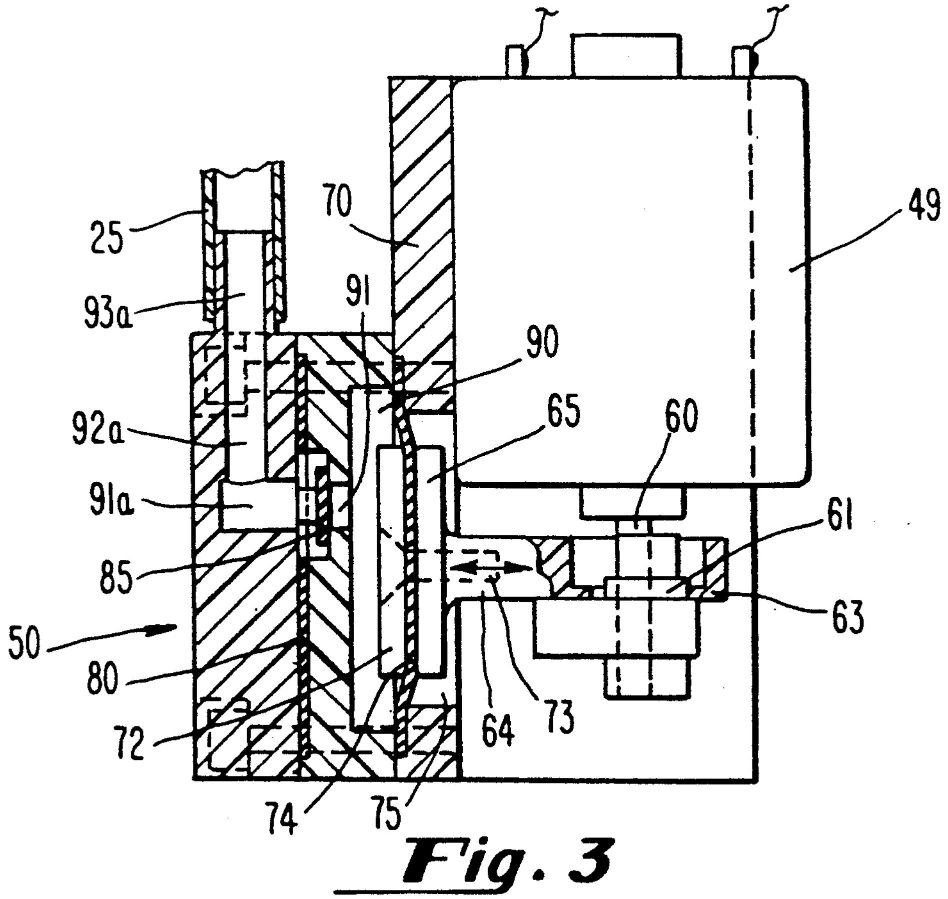
FIG. 3 is a enlarged view, taken along lines 3—3 of FIG. 2, of the unique air and vacuum pump assembly of this invention.

FIG. 3 shows in enlarged detail the motor 49 which is activated by microswitch 40. As indicated, motor 49 has a shaft 60 which rotates in one direction during motor activation. Shaft 60 is within eccentric 61 located in the piston ring 63 which is connected to piston rod 64. The latter is connected to a piston head 65 whereby, during rotation of shaft 60, piston rod 64 and connected head 65 are moved in reciprocating fashion.

Piston head 65 retains a flexible membrane 74 attached thereto by a plate 72 held by a screw 73.

Figure 4:
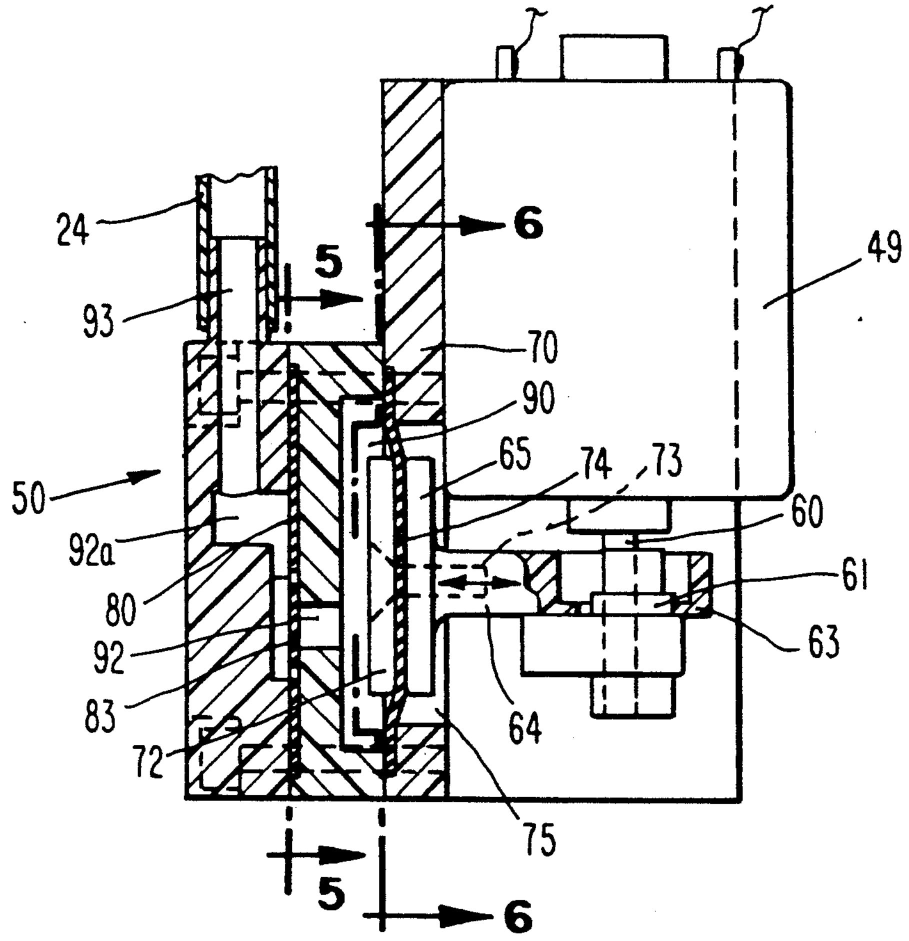
FIG. 4 is a sectional view along the lines 4—4 of FIG. 2 showing the unique air and vacuum pump assembly of this invention.
Figure 5:
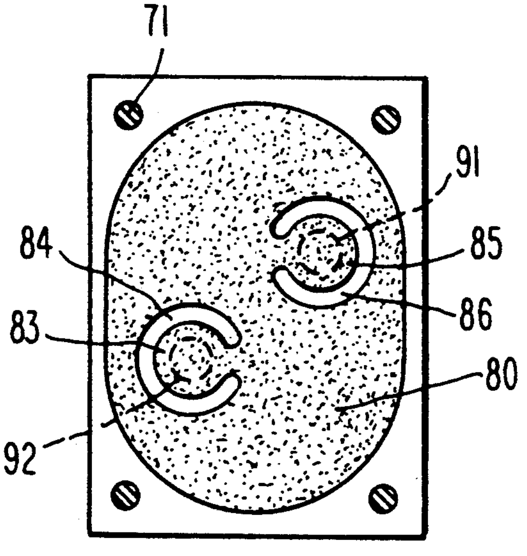
FIG. 5 is a sectional view along the lines 5—5 of FIG. 4 showing the unique oval-like flapper valve of this invention.
Figure 6:
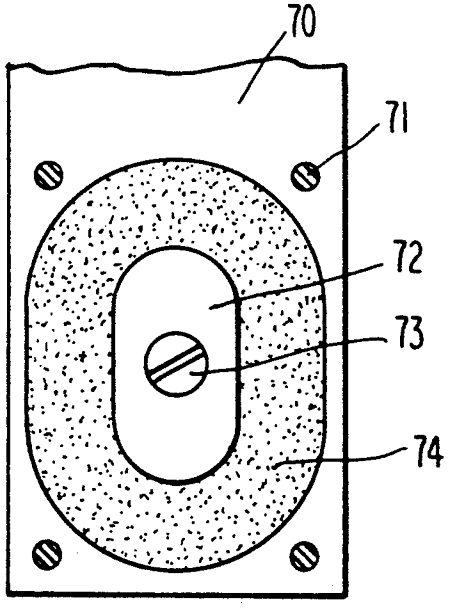
FIG. 6 is a sectional view along the lines 6—6 of FIG. 4 showing the unique oval-like piston head diaphragm of this invention.

A flexible second membrane 80 is shown in FIGS. 4 and 5 and is separated from member 74 by a space 90 in front of member 74 and is connected thereto by a channels 92 and 92*a*. Second member 80, which acts as a diaphragm, is in the shape of an oval-like element. Member 80 has a semi-circular cutout 84 which allows air to pass via the movement of air pressure flapper area 83 through passage 92.

Similarly, as shown in FIGS. 3 and 5, there is a vacuum flapper valve 85 defined by cut out 86. Flapper valve 85 permits passage of a vacuum through channels 91, 91*a*, 92*a*, 93*a* to tube 25.

It will be understood that when motor 49 is activated, piston head 65 is moved in reciprocation alternately to right and the left in FIG. 3. This, in turn, causes diaphragm 74 to move with piston head 65 in a back and forth movement, since piston rod 64 is controlled by eccentric 61, whereby diaphragm 74 alternately pushes air out of chamber 90 and sucks air into chamber 90.

More specifically, movement of the piston 65 and diaphragm 74 to the right in FIG. 3 causes suction flapper 85 to open and thus move from its normal position against 91*a* as shown in FIG. 3 and draw in air into piston chamber 90 from connecting passages 92, 92*a* and 93 and thence from vacuum line 24. If air control valve 27 is in the suction mode, as determined by pressing plunger 31, a vacuum will be created in line 23*a* which, in turn, will draw liquid into pipet 13.

Conversely, when moved to the left in FIG. 4, flapper valve 83 permits the movement of air under pressure out of chamber 90 to create positive air pressure which forces air from chamber 90 through conduits 91, 91*a*, 92*a* and 93*a* and thence the air under pressure moves into line 25 to control valve 27. If the latter is in the pressure mode, i.e., if plunger 29 is depressed, such pressurized air will be permitted to pass through control valve 27 into line 23*a* to expel the fluid from the pipet 13.

In operation, the end of pipet 13 is placed in the liquid to be drawn into the pipet, and the operator presses vacuum plunger 31, actuating motor 49. As shown in my aforesaid prior U.S. Pat. No. 4,624,147, valve means 27 is controlled by movement of plunger 31 so that a vacuum is created in line 23*a* as described above to draw liquid into the pipet 13.

When the desired amount of liquid is drawn into pipet 13, the vacuum plunger 31 is released and the pipet gun 10 is transported to the place where the liquid is to be discharged. Then air plunger 29 is pressed by the operator, which activates valve 27 which, as described above, permits air supply source 50 to impart positive air pressure which passes from chamber 90 and ultimately into line 23*a* so that pressurized air passes into pipet 13 to expel the liquid from the pipet 13.

I claim:

1. A pipet gun having a body and means for holding a pipet, first means for creating a vacuum and positive air pressure within the gun, including motive means for said first means including a first diaphragm which is oval-like in shape and a power supply for the motive means, second means including flapper valve means for controlling the delivery of air pressure and vacuum to control valve means manually operable to control delivery of air pressure and vacuum to the pipet, all of which means are contained within the body of the gun.

2. The invention of claim 1 wherein the flapper valve means are incorporated in a second diaphragm, and there is a flapper valve for air control and another flapper valve for vacuum control.

* * * * *